United States Patent [19]

Stürtz et al.

[11] Patent Number: 4,644,447
[45] Date of Patent: Feb. 17, 1987

[54] LAMP UNIT FOR VEHICLES

[75] Inventors: Günter Stürtz, Weil im Schönbuch; Reiner Jocher, Aidlingen; Hartmut Baitinger, Jettingen, all of Fed. Rep. of Germany

[73] Assignee: Daimler-Benz Aktiengesellschaft, Fed. Rep. of Germany

[21] Appl. No.: 800,723

[22] Filed: Nov. 22, 1985

[30] Foreign Application Priority Data

Nov. 24, 1984 [DE] Fed. Rep. of Germany ....... 3442902

[51] Int. Cl.4 ............................................. B60Q 1/00
[52] U.S. Cl. ..................................... 362/61; 362/369; 362/396
[58] Field of Search ................. 362/61, 368, 369, 390, 362/396

[56] References Cited

U.S. PATENT DOCUMENTS

| 3,757,109 | 9/1972 | Knecht et al. | 362/369 |
| 4,128,865 | 12/1978 | Johnson | 362/369 |
| 4,422,136 | 12/1983 | Newman et al. | 362/61 |

FOREIGN PATENT DOCUMENTS

| 3108059 | 10/1982 | Fed. Rep. of Germany | 362/61 |
| 3127641 | 3/1983 | Fed. Rep. of Germany | 362/390 |

Primary Examiner—E. Rollins Cross
Attorney, Agent, or Firm—Barnes & Thornburg

[57] ABSTRACT

Lamp unit for vehicles which is retained slidably under the effect of force in the longitudinal direction of the vehicle in order to reduce the danger of injury to pedestrians et cetera, and also the danger of damage to the lamps in the case of minor accidents.

21 Claims, 4 Drawing Figures

LAMP UNIT FOR VEHICLES

The invention relates to a lamp unit for vehicles which exhibits a lamp housing covered by light-diffusing glass on the front side and is retained relative to the vehicle body via a bracing means yielding to the effect of force, particularly to the effect of shock, in the longitudinal direction of the vehicle, which bracing means comprises mounting means with parts arranged on the vehicle body and on the lamp housing.

In a known construction of this type (German Pat. No. 3,108,059) the lamp unit is integrated into the front part of the vehicle and articulated pivotably in its region near the bumper, whereas its region remote from the bumper is braced yieldingly in the longitudinal direction of the vehicle against the vehicle body via a resilient cushion. A certain yielding of the lamp unit is possible due to this construction in the event of a collision with road users, such as pedestrians, cyclists, against the front of the vehicle.

The invention deals with the same set of problems and adopts the aim, with structurally simple means, to integrate the lamp unit yieldingly into the front of the vehicle in such a way that injuries, particularly soft tissue injuries to such road users such as pedestrians and cyclists, are at least substantially reduced.

This is achieved according to the invention in a lamp unit of the type initially stated, when the mounting parts are constructed by guide elements with guide tracks extending in the longitudinal direction of the vehicle, and by tensioning elements tensionable relative to the guide elements and guided via the guide tracks. This mode of construction makes it possible, under the effect of a force, particularly shock stresses, for the lamp unit to escape from its structurally determined installation position in the longitudinal direction of the vehicle with at least partial guidance, which is convenient in order to avoid high repair costs, for example, particularly in the case of minor accidents.

Within the scope of the invention, the guide elements may be associated both with the vehicle body and also with the lamp housing.

A particularly convenient simple structural configuration is obtained if the guide tracks are formed by slot guides.

Such slot guides can be produced for a small outlay when the guide elements are formed by brackets which exhibit in cross-section the shape of a partly covered channel and in which the slots are provided in this cover.

Such brackets can be integrated in a particularly simple manner into the housing structure of the lamp unit and permit, in combination with the use of suitable tensioning elements, a particularly simple anchorage of the lamp unit relative to the relative body by simple screw connection.

It is in turn convenient for this purpose if the tensioning elements are constructed as U-shaped spring clamps, which are pushed, as plug-in clips with their extension in the longitudinal direction of the vehicle, onto the covers of the brackets and tensioned relative to the brackets via the screw connection. In the case of a corresponding effect of force, for example, shock stressing, the lamp units can escape in the longitudinal direction of the vehicle, overcoming the tensioning force exerted via the fastening screws, while a guidance exists at least so long as the tensioning elements, which simultaneously receive the transverse guide means relative to the brackets, are in engagement with the bracket.

The foregoing and other objects, features and advantages of the present invention will become more apparent from the following description when taken in connection with the accompanying drawings, which show, for the purpose of illustration only, plural embodiments in accordance with the present invention, and wherein.

Figure 1:
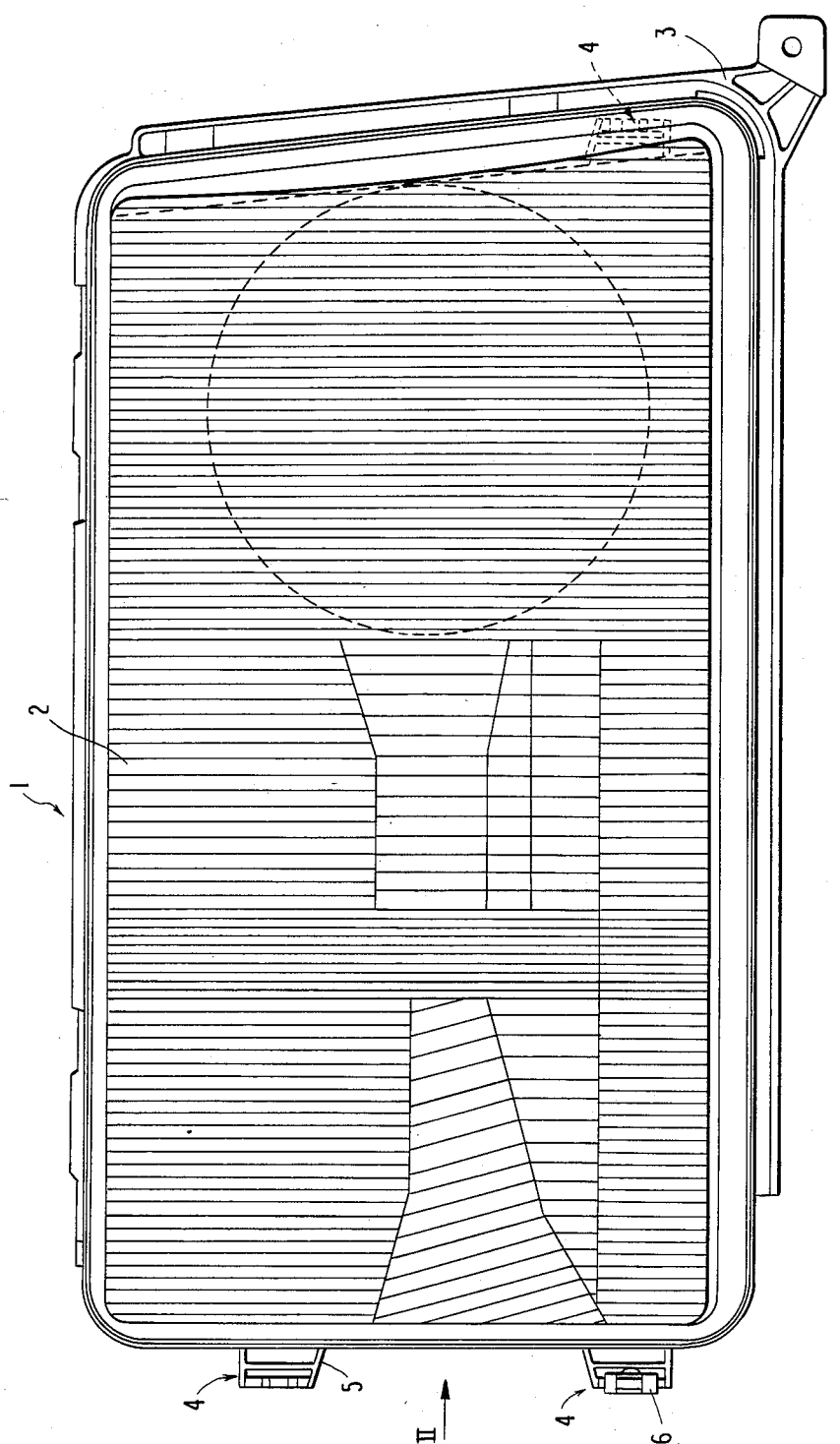
FIG. 1 shows a front elevation of a lamp unit according to the invention.

Referring now to the drawings wherein like reference numerals are used to designate like parts and more particularly to FIG. 1, the lamp unit is designated 1, its light-diffusing glass 2, and the lamp housing 3.

The lamp unit is retained relative to the vehicle body, not shown here, via a bracing means yielding in the longitudinal direction of the vehicle and comprising mounting parts 4, which are associated with the lamp unit in the exemplary embodiment and which each comprise a bracket 5 integral with the housing as a guide element, and a tensioning element 6.

Figure 2:
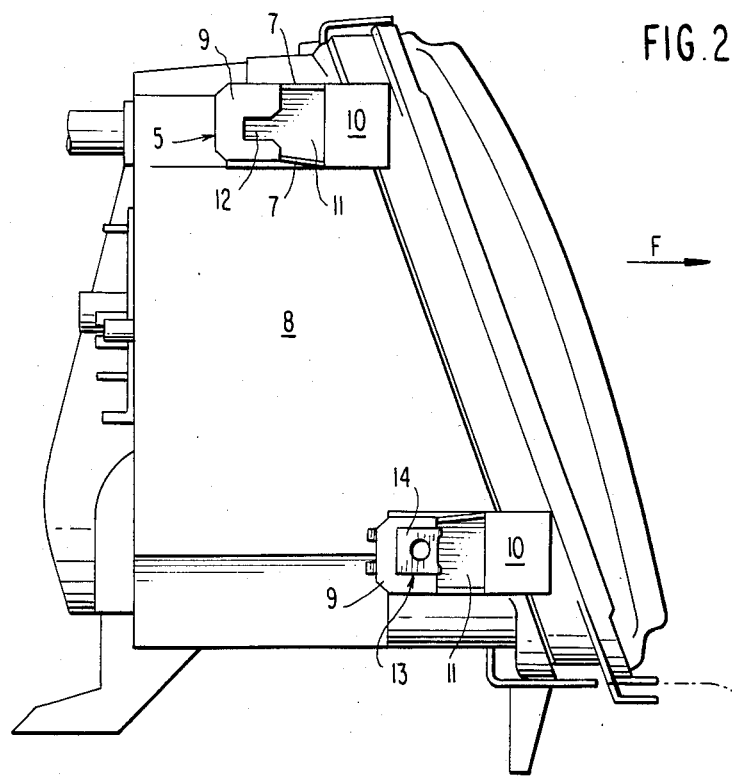
FIG. 2 shows an elevation of this lamp unit according to the arrow II in FIG. 1.

As may be seen particularly from the side elevation according to FIG. 2 in combination with FIG. 1, the brackets 5 serving as guide elements, which extend in the longitudinal direction of the vehicle, are of channel-like construction and exhibit side walls 7 and covers 9 connecting the latter and located at an interval from the housing side wall 8 carrying the side walls 7. The covers 9 are located at a greater interval from the side walls 8 than cover parts 10 located at an interval in front of them, and a bracket region without cover, namely the region 11, is provided in each case in front of the covers 9 and/or between the covers 9 and the cover parts 10.

As illustrated in the upper half of FIG. 2, the covers 9 contain slots 12 which extend in the longitudinal direction of the vehicle, and which are open towards the front side, relative to the longitudinal direction of the vehicle, of the cover 9, that is to say towards the region 11.

Figure 3:
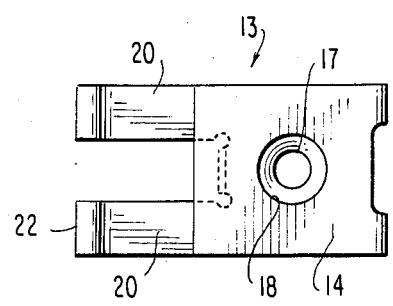
FIG. 3 shows a bottom plan of a tensioning element used in the scope of the invention.
Figure 4:
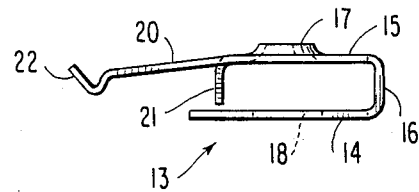
FIG. 4 shows a side elevation of this tensioning element.

Tensioning elements 13, which are illustrated in detail in FIGS. 3 and 4 and which are each constructed as U-shaped plug-in clips, are placed upon the covers 9 exhibiting the slots 12 as guide tracks. The tensioning elements 13 exhibit members 14 and 15 which are connected by a bridge 16. In the assembled tensioning element 13, the bridge 16 is associated with the edge of the cover 9 facing the region 11, and of the members of the tensioning element 13, the member 15 engages under the cover 9, whereas the member 14 rests upon cover 9. In the exemplary embodiment the member 15 of the tensioning element 13 is provided with a tapped bore 17, to which a plug-through aperture 18 in the member 14 corresponds. As FIG. 2 shows particularly, the member 15 is further divided in its terminal end region extending beyond the member 14 into two externally located spring tabs 20 and an angled tab located therebetween and forming a tab stop 21. A bracing means parallel to the bridge 16 is created by the stop 21, so that when the members 14 and 15 are mutually tensioned the distance between the members 14 and 15 is determined by the bridge 16 and the tab stop 21. The tensioning force with which the tensioning element 13, in its fastened position, is retained on the cover 9, and relative to the bracket 5 when the lamp unit is screwed relative to the vehicle body via a tensioning screw, not shown, engaging into the tapped bore 17, is also determined by this means. In the untensioned state the tensioning element 13 is secured relative to the bracket 5, and/or to its cover 9, via the spring tabs 20, which engage with catch lugs 22 behind the rear edge, relative to the direction of travel, of the cover 9.

As is not immediately visible in the drawing, the stop 21 engages into the slot 12, and a transverse guidance of the tensioning element 13 relative to the bracket therefore exists also in the unscrewed state. In the screwed state, the tensioning screw, not shown here, which engages into the tapped bore 17, engages additionally through the slot 12. When the lamp unit is stressed with force counter to the direction of travel F in FIG. 2, that is to say, struck by a pedestrian, it can escape counter to the direction of travel F, namely by the tensioning elements 13, which are maintained relative to the vehicle body by the fastening screw, not shown here, slipping off the brackets, and here specifically from the covers 9. The open region present in front of the covers 9 ensures adequate space, and the cover parts 10 are staggered sufficiently in height towards the lamp housing relative to the covers 9 that no obstruction occurs here either. During the sliding movement, a guidance of the lamp housing still exists so long as the fastening screw or the stop 21 is guided in the relative slot 12.

It is obviously also possible within the scope of the invention to associate the brackets with the vehicle body and thus to provide a substantially mirror-image construction overall.

As is clear from FIG. 1, mounting means 4 forming the bracing means are provided on both sides, three in all in the exemplary embodiment, while two are located on the side illustrated FIG. 2, whereas on the opposite side of the lamp unit only one mounting element 4 is provided, which in the scope of the invention is preferably located approximately at the height of one of the mounting elements 4 on the other side of the lamp housing. In FIG. 1 the lower mounting parts are arranged mutually opposite, so that an escape only upwards is optionally possible by forming a pivot axis determined by the lower mounting elements.

The mounting elements are respectively of substantially identical configuration in their construction.

While we have shown and described plural embodiments in accordance with the present invention, it is understood that the same is not limited thereto but is susceptible to numerous changes and modifications as known to one having ordinary skill in the art and we therefore do not wish to be limited to the details shown and described herein, but intend to cover all such modifications as are encompassed by the scope of the appended claims.

We claim:

1. A lamp unit for vehicles which exhibits a lamp housing covered by a light-diffusing glass on the front side and is retained relative to the vehicle body via a bracing means yielding to the effect of force, particularly to the effect of shock, in the longitudinal direction of the vehicle, which bracing means comprises mounting means with parts arranged on the vehicle body and on the lamp housing, characterized in that the mounting parts are formed on the one hand by guide elements with guide tracks extending in the longitudinal direction of the vehicle, and on the other hand by tensioning elements tensionable relative to the guide elements and guided via their guide tracks.

2. A lamp unit according to claim 1, characterized in that the guide elements are associated with the vehicle body.

3. A lamp unit according to claim 1, characterized in that the guide elements are associated with the lamp housing.

4. A lamp unit according to claim 1, characterized in that the guide tracks are formed by slots.

5. A lamp unit according to claim 1, characterized in that the guide tracks are open at their one end.

6. A lamp unit according to claim 1, characterized in that the guide elements are formed by brackets which are constructed as a partially covered channel, in the cover of which the guide tracks are provided.

7. A lamp unit according to claim 3, characterized in that in the case of guide tracks associated with the lamp housing, the slots are open at their ends located opposite the direction of an effect of force.

8. A lamp unit according to claim 2, characterized in that in the case of guide elements associated with the vehicle body, the slots are open at their ends located in the direction of effect of force.

9. A lamp unit according to claim 1, characterized in that the tensioning elements are formed by spring clamps.

10. A lamp unit according to claim 9, characterized in that the spring clamps are of U-shaped configuration.

11. A lamp unit according to claim 9, characterized in that the spring clamps each comprise a tapped bore for a tensioning screw in at least one member thereof.

12. A lamp unit according to claim 11, wherein each spring clamp comnprises plural members joined by a bridge, the members being limited in their mutual pivoting by a stop at an end region thereof remote from said bridge between said members.

13. A lamp unit according to claim 12, characterized in that the stop is formed by at least one tab bent out of one of the members.

14. A lamp unit according to claim 12, characterized in that the stop and tapped bore are located in a common plane, substantially in the longitudinal vehicle median, of the tensioning element.

15. A lamp unit according to claim 13, characterized in that the stop comprises a transverse guide element engaging into the slots.

16. A lamp unit according to claim 12, characterized in that at least a first of the members of the spring clamps is provided in the region of its free end with catch lugs directed towards a second member.

17. A lamp unit according to claim 16, characterized in that the catch lugs are provided on at least a member section projecting beyond the other member.

18. A lamp unit according to claim 17, characterized in that catch lugs, stop and tapped bore are associated with the same member.

19. A lamp unit according to claim 12, characterized in that, relative to the longitudinal direction of the said members, the stop is located between said tapped bore and said catch lugs.

20. A lamp unit according to claim 16, characterized in that for at least one of said brackets, the length of a bracket cover thereof corresponds to the free length of the member carrying said catch lugs between said catch lugs and said bridge of the tensioning element.

21. A lamp unit according to claim 20, characterized in that for one of said brackets, the member of the tensioning element carrying tapped bore, stop and catch lugs engages under the cover of the said bracket.

* * * * *